UNITED STATES PATENT OFFICE.

WALTER S. CROWELL, OF PHILADELPHIA, PENNSYLVANIA, ASSIGNOR TO THE S. S. WHITE DENTAL MANUFACTURING COMPANY, A CORPORATION OF PENNSYLVANIA.

DENTAL CEMENT.

1,244,296.      Specification of Letters Patent.      Patented Oct. 23, 1917.

No Drawing.      Application filed January 26, 1917. Serial No. 144,617.

*To all whom it may concern:*

Be it known that I, WALTER S. CROWELL, a citizen of the United States, and a resident of the city of Philadelphia, county of Philadelphia, State of Pennsylvania, have invented certain new and useful Improvements in Dental Cements, of which the following is a specification.

My invention relates particularly to cements adapted to be used in the art of dentistry, and is especially directed to that class of cements which are employed in stopping or filling cavities of natural teeth, and for setting crowns, bridges and inlays.

The principal object of my invention is, to provide a cement that exhibits the characteristic germicidal action of mercury salts in a mild and controllable manner.

Other objects of my invention are, to provide a cement that will be more germicidal in its action than any of the well known copper cements now used in dentistry, and that may be used in the mouth without danger of the poisonous action of aqueous solutions of mercury salts.

My invention comprehends a cement powder which when compounded with a suitable liquid to a mass of proper consistency for the purpose, and allowed to set, will manifest germicidal action upon its surroundings so as to inhibit the recurrence of dental caries or decay of the teeth.

I have found that a desirable composition which exhibits the characteristic germicidal action of mercury in a mild and controllable manner may be preferably contained in composition with an ordinary oxyphosphate of zinc cement powder, a phosphate of mercury compound.

Furthermore, I have found that by mixing one per cent. of mercury phosphate with cement powder, and mixing the resultant powder with cement liquid, on setting, a mass results which is germicidal to a sufficient extent to prevent or inhibit the growth of bacteria in its immediate environments, and that the physical properties of the cement are not impared thereby.

The presence of mercury salt causes the cement to be more germicidal in its action than any of the copper cements now employed in dentistry, yet it may be used in the mouth without danger of the poisonous action of aqueous solutions of mercury salts.

Although I have herein mentioned the mixing of one per cent. of mercury phosphate with cement powder, it is to be understood that greater or less quantities may be employed to produce the result desired, and that the result may be produced if the mercury salt be dissolved in the cement liquid in such quantity that the hardened cement contain an equal proportion of mercury to that produced from the admixture of mercury salt with the cement powder; and, therefore, I do not desire to limit my invention to the precise proportions and order of mixing herein set forth and defined in the appended claims.

Having thus described my invention, I claim:

1. An article of manufacture comprising a filling cement having, in composition, cement powder and a phosphate of mercury.

2. An article of manufacture comprising a filling cement having, in composition, oxyphosphate of zinc cement powder and a phosphate of mercury.

3. An article of manufacture comprising a filling cement containing a slightly soluble mercury compound, and adapted to undergo a setting reaction when compounded with a phosphoric acid solution.

4. An article of manufacture comprising the mixture of an oxyphosphate of zinc cement powder and an acid phosphate liquid containing dissolved in it a mercury salt.

In witness whereof, I have hereunto set my hand this 25th day of January, A. D., 1917.

WALTER S. CROWELL.

Witnesses:
WILLIAM J. RUSSELL,
CLIFTON C. HALLOWELL.